US010515319B2

(12) United States Patent
Henning et al.

(10) Patent No.: US 10,515,319 B2
(45) Date of Patent: Dec. 24, 2019

(54) SYSTEM AND METHOD FOR COMPUTING A PROBABILITY THAT AN OBJECT COMPRISES A TARGET (71) Applicant: Fetch Robotics, Inc., San Jose, CA (US)

(72) Inventors: Alex Henning, San Jose, CA (US); Michael Ferguson, San Jose, CA (US); Melonee Wise, San Jose, CA (US)

(73) Assignee: Fetch Robotics, Inc., San Jose, CA (US)

( * ) Notice: Subject to any disclaimer, the term of this patent is extended or adjusted under 35 U.S.C. 154(b) by 252 days.

(21) Appl. No.: 15/382,074

(22) Filed: Dec. 16, 2016

(65) Prior Publication Data

US 2018/0169857 A1 Jun. 21, 2018

(51) Int. Cl.
*G06N 20/00* (2019.01)
*G06N 3/00* (2006.01)

(52) U.S. Cl.
CPC .............. *G06N 20/00* (2019.01); *G06N 3/008* (2013.01); *Y10S 901/01* (2013.01); *Y10S 901/46* (2013.01)

(58) Field of Classification Search
None
See application file for complete search history.

(56) References Cited

U.S. PATENT DOCUMENTS

| 8,688,275 | B1 | 4/2014 | LaFary et al. |
| 9,358,975 | B1 | 6/2016 | Watts |
| 9,730,643 | B2* | 8/2017 | Georgescu ............... G06T 7/73 |
| 10,126,114 | B2* | 11/2018 | Dowski, Jr. .......... G01B 11/002 |
| 2011/0052087 | A1* | 3/2011 | Mukherjee ............. H04N 19/46 382/248 |
| 2014/0324209 | A1* | 10/2014 | Yamada .................... D05C 5/04 700/138 |
| 2015/0224648 | A1* | 8/2015 | Lee ........................ B25J 9/1697 700/259 |
| 2016/0174902 | A1* | 6/2016 | Georgescu ................ G06T 7/73 600/408 |
| 2016/0341540 | A1* | 11/2016 | Dowski, Jr. ............. G01S 3/783 |
| 2018/0169857 | A1* | 6/2018 | Henning ................ G06N 20/00 |
| 2019/0011530 | A1* | 1/2019 | Dowski, Jr. ............... G01S 5/16 |

OTHER PUBLICATIONS

Park, Jong Jin and Benjamin Kulpars, A Smooth Control Law for Graceful Motion of Differential Wheeled Mobile Robots in 2D Environment, Proceedings—IEEE International Conference on Robotics and Automation, Apr. 2011, 2011 IEEE International Conference on Robotics and Automation (ICRA-11).

(Continued)

*Primary Examiner* — Tahmina N Ansari
(74) *Attorney, Agent, or Firm* — J. Steven Svoboda (57) ABSTRACT

A method for computing a probability that an object comprises a target includes: performing a scan of an area comprising the object, generating points; creating a segment corresponding to the object using the points as segment points, the segment extending from a first segment point to a last segment point, the segment comprising a plurality of the segment points; and applying a metric, computing the probability that the object comprises the target.

11 Claims, 7 Drawing Sheets (56) References Cited

OTHER PUBLICATIONS

Gerkey, Brian P. and Kurt Konolige, Planning and Control in Unstructured Terrain, In Workshop on Path Planning on Costmaps, Proceedings of the IEEE International Conference on Robotics and Automation, Jan. 2008 (ICRA, 2008).

Arras, Kai O, Oscar Martinez Mozos, and Wolfram Burgard, Using Boosted Features for the Detection of People in 2D Range Data, 2007 IEEE International Conference on Robotics and Automation, ICRA 2007, Rome, Italy, Apr. 10-14, 2007.

Thrun, Sebastian, Wolfram Burgard, and Dieter Fox, Probabilistic Robots, The MIT Press, Cambridge, Massachusetts, 2005, pp. 97-113.

Fox, Dieter, Wolfram Burgard, and Sebastian Thrun, The Dynamic Window Approach to Collision Avoidance, IEEE Robotics & Automation Magazine, vol. 4, No. 1, 1997.

Freund, Yoav and Robert E. Schapire, A Decision-Theoretic Generalization of On-Line Learning and an Application to Boosting, Journal of Computer and System Sciences, vol. 55, pp. 119-139, 1997.

Lu, David V., Hershberger, Dave, and Smart, William D., Layered Costmaps for Context-Sensitive Navigation, Intelligent Robots and Systems (IROS 2014), 2014 IEEE/RSJ International Conference on Intelligent Robots and Systems, Sep. 14-18, 2014.

\* cited by examiner

SYSTEM AND METHOD FOR COMPUTING A PROBABILITY THAT AN OBJECT COMPRISES A TARGET

SUMMARY

This invention relates in general to a system and method for computing a probability that an object comprises a target.

A method for computing a probability that an object comprises a target includes: performing a scan of an area, generating points; creating a segment corresponding to the object using the points as segment points, the segment extending from a first segment point to a last segment point; and applying a metric, computing the probability that the segment comprises the target.

A method for computing a probability that an object comprises a target includes: performing a scan of an area, generating points; creating a segment corresponding to the object using the points as segment points, the segment extending from a first segment point to a last segment point, the segment comprising a plurality of the segment points; adding the segment to a candidate set of lines; for at least one segment point, computing a point-segment distance from the point to the segment; determining that the point-segment distance is not less than a threshold distance; finding a farthest point that comprises the point that is farthest from the segment; and updating a metric usable to compute the probability that the object comprises the target.

A method for computing a probability that an object comprises a target includes: performing a scan of an area, generating points; creating a segment corresponding to the object using the points as segment points, the segment extending from a first segment point to a last segment point, the segment comprising a plurality of the segment points; adding the segment to a candidate set of lines; for at least one segment point, computing a point-segment distance from the point to the segment; determining that the point-segment distance is less than a threshold distance; and updating a metric usable to compute the probability that the object comprises the target.

A method for computing a probability that an object comprises a target includes: creating a segment corresponding to the object, the segment extending from a first segment point to a last segment point, the segment comprising a plurality of segment points, using points obtained in a scan of an area comprising the segment; adding the segment to a candidate set of lines; for at least one segment point, computing a point-segment distance from the point to the segment; determining that the point-segment distance is not less than a threshold distance; finding a farthest point that comprises the point that is farthest from the segment; separating the segment points in the segment into a first group of adjacent segment points and a second group of adjacent segment points, with the farthest point being the only segment point in common between the first group and the second group, the farthest point being defined as the last segment point for the first group, the farthest point also being defined as the first segment point for the second group; and removing the segment from a candidate set of lines.

A method for computing a probability that an object comprises a target includes: creating a segment corresponding to the object, the segment extending from a first segment point to a last segment point, the segment comprising a plurality of segment points, using points obtained in a scan of an area comprising the segment; adding the segment to a candidate set of lines; for at least one segment point, computing a point-segment distance from the point to the segment; and determining that the point-segment distance is less than a threshold distance.

A method for computing a probability that an object comprises a target includes: creating a segment corresponding to the object, the segment extending from a first segment point to a last segment point, the segment comprising a plurality of segment points, using points obtained in a scan of an area situated in an environment of a robot, the area comprising the segment; adding the segment to a candidate set of lines; for at least one segment point, computing a point-segment distance from the point to the segment; determining that the point-segment distance is not less than a threshold distance; finding a farthest point that comprises the point that is farthest from the segment; separating the segment points in the segment into a first group of adjacent segment points and a second group of adjacent segment points, with the farthest point being the only segment point in common between the first group and the second group, the farthest point being defined as the last segment point for the first group, the farthest point also being defined as the first segment point for the second group; removing the segment from a candidate set of lines; identifying the segment as one or more of target and non-target, wherein the identifying step comprises a sub-step of: training the system to improve the classification performance, wherein the training sub-step comprises sub-sub-steps of: determining that an environment is empty of targets; driving the robot through the target-free environment so that the system learns that objects in the target-free environment are not targets; driving the robot through an environment comprising a target; collecting data regarding a location of the target; obtaining information on the location of the target from a tag configured to track the location of the target, the target wearing a vest comprising the tag; and correlating the data against the information.

DETAILED DESCRIPTION

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

The system includes a plurality of components such as one or more of electronic components, hardware components, and computer software components. A number of such components can be combined or divided in the system. An example component of the system includes a set and/or series of computer instructions written in or implemented with any of a number of programming languages, as will be appreciated by those skilled in the art.

The system in one example employs one or more computer-readable signal-bearing media. The computer-readable signal bearing media store software, firmware and/or assembly language for performing one or more portions of one or more implementations of the invention. The computer-readable signal-bearing medium for the system in one example comprises one or more of a magnetic, electrical, optical, biological, and atomic data storage medium. For example, the computer-readable signal-bearing medium comprises one or more of floppy disks, magnetic tapes, CD-ROMs, DVD-ROMs, hard disk drives, downloadable files, files executable "in the cloud," electronic memory, and another computer-readable signal-bearing medium.

Any logic or application described herein, including but not limited to the server-side master application, the server-side customization application, and the server-side streaming application that comprises software or code can be embodied in any non-transitory computer-readable medium for use by or in connection with an instruction execution system such as, for example, a server-side processor in a computer system or other system. In this sense, the logic may comprise, for example, statements including instructions and declarations that can be fetched from the computer-readable medium and can be executed by the instruction execution system. In the context of the present disclosure, a computer-readable medium can be any medium that can contain, store, or maintain the logic or application described herein for use by or in connection with the instruction execution system. For example, the computer-readable medium may comprise one or more of random access memory (RAM), read-only memory (ROM), hard disk drive, solid-state drive, USB flash drive, memory card, floppy disk, optical disc such as compact disc (CD) or digital versatile disc (DVD), magnetic tape, and other memory components. For example, the RAM may comprise one or more of static random access memory (SRAM), dynamic random access memory (DRAM), magnetic random access memory (MRAM), and other forms of RAM. For example, the ROM may comprise one or more of programmable read-only memory (PROM), erasable programmable read-only memory (EPROM), electrically erasable programmable read-only memory (EEPROM), and other forms of ROM.

For example, the target comprises one or more of a human, a human appendage, a robot, a robot appendage, a forklift, a wall, a cart, a shelf, a chair, another object, and another target. According to embodiments of the invention, a minimum number of lines is determined to comprise all points in a segment. According to further embodiments of the invention, the minimum number of lines is determined to comprise all points in a scan segment. For example, a shelf leg typically requires two lines. For example, a human leg requires more than two lines because it is rounder than a shelf leg.

Figure 1:
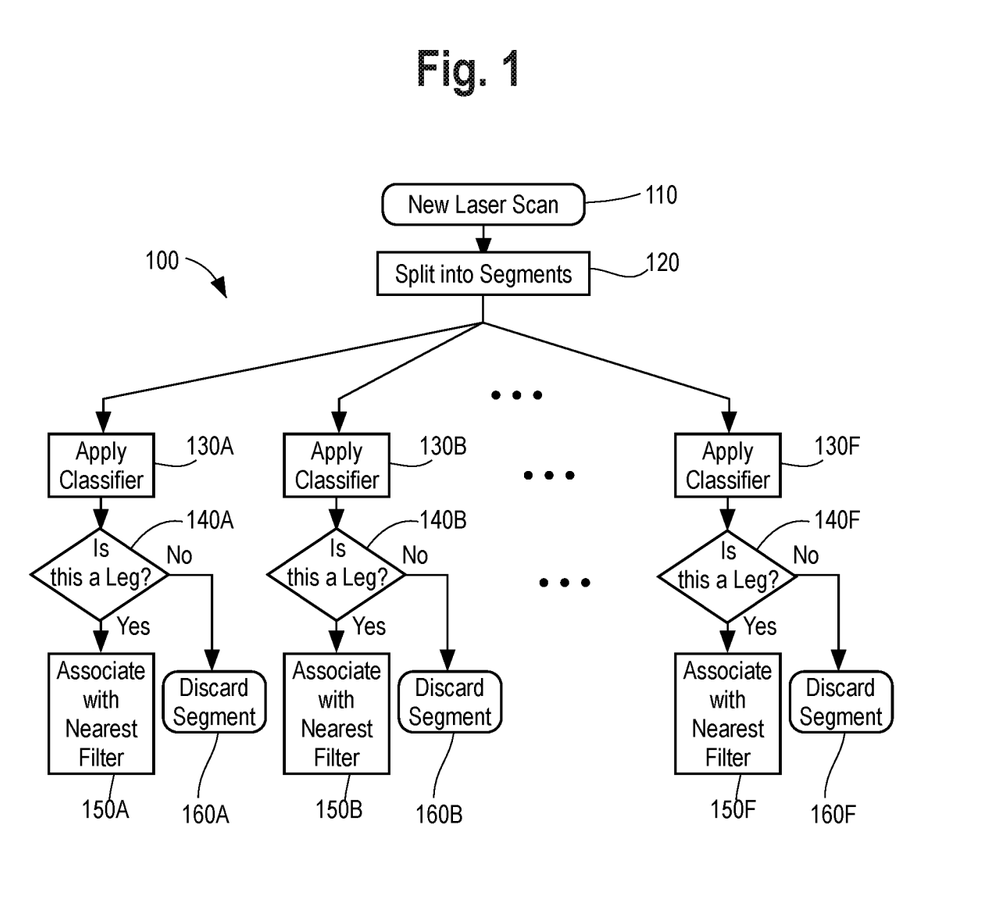
FIG. 1 is a flowchart of a method for computing a probability that an object comprises a target.

FIG. 1 is a flowchart of a method 100 for computing a probability that an object comprises a target. For example, the method 100 classifies the object as target or non-target. The order of the steps in the method 100 is not constrained to that shown in FIG. 1 or described in the following discussion. Several of the steps could occur in a different order without affecting the final result.

In step 110, the system performs a scan of an area comprising a point in an environment, generating points. For example, the area is situated in an environment of a robot. For example, the environment comprises an environment of a robot. For example, the scan comprises a laser scan. For example, the scan comprises one or more of a robot and an object in the environment of the robot. For example, the object comprises one or more of a human appendage, a robotic appendage, a robot, a wall, a cart, a forklift, a shelf, a chair, and another object. For example, the human appendage comprises one or more of a human arm, a human leg, and another human appendage. For example, the robotic appendage comprises one or more of a robot arm, a robot leg, and another robotic appendage. Block 110 then transfers control to block 120.

In step 120, the system creates a segment corresponding to the object. For example, the system divides the points into segments. For example, the robot comprises a processor that divides the scan data. For example, a server comprises the processor. For example, a segment comprises at least two segment points. For example, the segment extends from a first segment point to a last segment point. For example, the segment points are close to each other. For example, the segment points are within a Euclidean distance of each other. For example, the Euclidean distance is specified by a user. For example, the processor calculates the Euclidean distance on the fly.

For example, the number of segments is approximately equal to the number of points. For example, the number of segments is exactly equal to the number of points. For example, the segments are divided using an algorithm that assesses one or more of the location of points missing from the limb and the importance of the missing point. For example, the segments into which the area is divided can be created whenever two adjacent points are separated by a distance greater than a predetermined length. For example, the segments into which the area is divided can be created whenever the two adjacent points are separated by a distance greater than six centimeters (6 cm).

For example, a segment corresponds to an object in the environment. For example, a segment comprises the object. For example, the object comprises the segment. For example, the object comprises one or more of an object in the environment and a portion of an object in the environment. For example, a segment comprises one or more of a human appendage, a robotic appendage, a robot, a wall, a cart, a forklift, a shelf, a chair, and another object in the environment. For example, a segment comprises a portion of one or more of a human appendage, a robotic appendage, a robot, a wall, a cart, a forklift, a shelf, a chair, and another object in the environment.

Block 120 then transfers control to one or more of blocks 130A, 130B . . . 130F (as shown). The number of segments is not limited to any specific number; the example shown uses six segments.

In steps 130A-130F, for at least one segment, a classifier computes a probability that a segment comprises a target. The probability is calculated using one or more metrics configured to help determine whether a segment comprises the object. For example, the metric comprises a point-segment distance from the point to the segment. For example, the computing step is performed for each segment point. For example, the system compares the distance from a point to a segment to one or more threshold distances to determine whether the point-segment distance is less than the threshold distance. The system can therefore estimate whether the object comprises the segment. For example, the threshold distance roughly expresses the amount of deviation from a straight line that is acceptable in order for the line to still be defined as straight within the noise level limits of the sensor being used.

For example, the metric comprises one or more of the point-segment distance from the point to the segment, a number of lines needed to cover points in the segment, a number of lines needed to cover all points in the segment to within a threshold distance, a best fit linear regression to the segment, a best fit circular approximation to the segment, and another metric. For example, after computing the best fit circular approximation to the segment, the processor compares the radius of the best fit circular approximation to one or more of a minimum expected circle and a maximum expected circle. One or more of the minimum expected circle and the maximum expected circle are calculated using an expected limb position. For example, the expected limb position is calculated. For example, the expected limb position is predesignated by a user.

For example, the processor computes a maximum distance between two points in the segment. For example, the processor then compares the computed maximum distance to a maximum threshold distance. For example, the maximum threshold distance is calculated. For example, the maximum threshold distance is predesignated by the user.

For example, the classifier uses information from more than one scan, such as the velocity estimate of a segment based on the best matching segment from the previous scan. For example, the best matching segment comprises the segment that is closest in Euclidean distance from the previous scan. For example, the best matching segment comprises the segment that is closest based on the previously scanned position of the segment and after applying the estimated velocity of the previous scan multiplied by the time increment since the previous scan. For example, the classifier comprises an estimate of whether the segment is located inside an obstacle known to the robot from a pre-defined map. For example, the classifier comprises an estimate of whether the segment is located inside a shelf known to the robot from a pre-defined map. Blocks 130A-130F then transfer control to respective blocks 140A-140F.

In steps 140A-140F, for at least one of the one or more segments, using the classifier, the system determines a likelihood that a segment comprises an object. For example, the system uses machine learning techniques to determine the likelihood. For example, the machine learning techniques comprise one or more of data from a previous scan. For example, the data from a previous scan comprises a likelihood that a segment comprises a target. For example, the system uses machine learning techniques to determine the likelihood that a segment comprises a target.

Preferably, although not necessarily, for each of the one or more segments, the processor applies a classifier to determine whether the segment comprises an object. If the classifier determines that the segment comprises the object, a filter uses the segment to compute the probability that the object comprises the target.

For example, for at least one segment, the classifier makes a bimodal determination that the segment comprises the limb. Alternatively, or additionally, the classifier computes a probability that the segment comprises the limb. For example, for each segment, the classifier makes a bimodal determination that the segment comprises the limb. Blocks 140A-140F then transfer control to respective blocks 150A-150F.

In steps 150A-150F, the segment is associated with a filter. For example, the filter is near to the segment. For example, the segment is associated with more than one filter. Blocks 150A-150F then transfer control to respective blocks 160A-160F.

In steps 160A-160F, a segment that does not have a high likelihood of comprising the object is discarded. For example, a segment that is not deemed to comprise the human leg is not used with the filters in the current iteration. The low likelihood segment may optionally be saved and used in a future iteration to reduce a likelihood of an observation comprising a human leg.

For each of the lines examined by the system, the line is compared to the candidate set. If it is within a threshold distance of a line within the candidate set, then the line is not added to the candidate set, but the system adds an index of the point as a point that is covered by the line already in the candidate set. If the line cannot be covered by a member of the candidate set, then the line is added to the candidate set along with the indices of the points forming the line. The threshold distance will depend on the scanner used, and can be one of the trained system parameters.

Once the set of candidate lines has been found, the system determines the minimum number of lines such that all points are covered.

FIGS. 2A-2D are a set of drawings showing how the method for computing a probability that an object comprises a target is applied to a corner that the system identifies as non-target. The corner-identifying feature finds a minimum set of lines that can be used to cover all points in a segment 200.

Figure 2A:
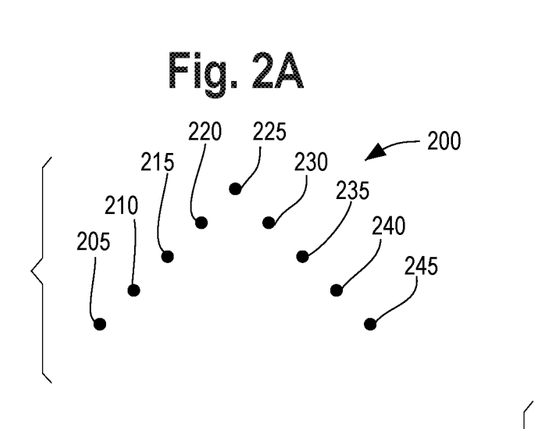
FIGS. 2A-2D are a set of drawings showing how the method for computing a probability that an object comprises a target is applied to a corner that the system identifies as non-target.

In FIG. 2A, a laser scanner scans the environment, generating a segment 200. As depicted in FIG. 2A, the laser scanner scans from left to right. The segment 200 comprises nine points, a first point 205, a second point 210, a third point 215, a fourth point 220, a fifth point 225, a sixth point 230, a seventh point 235, an eighth point 240, and a ninth point 245. The endpoints of the segment 200 are the first point 205 in the laser scan, which may also be referred to as a first endpoint 205, and the ninth point 245, which is the last point in the laser scan and which may also be referred to as a second endpoint 245.

Figure 2B:
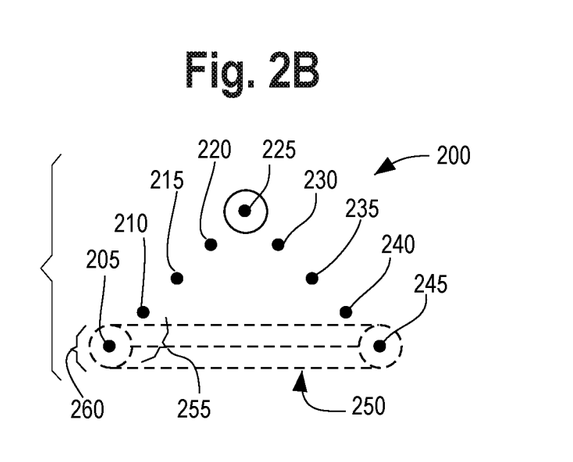

In FIG. 2B, the system draws a first line 250 that connects the first endpoint 205 to the second endpoint 245. The first line 250 becomes the first member of a candidate set of lines generated by the system in computing a probability that a corner comprises a target.

For at least one of the other points besides the first endpoint 205 and the second endpoint 245, the system compares the first line 250 to the point. For example, the system compares the second point 210 to the first line 250. If the system determines that the second point 210 has a first distance 255 from the first line 250 of less than a threshold distance 260, then a line to the second point 210 is not added to the candidate set, but the system records the second point 210 as a point 210 that is covered by the existing candidate set. As depicted, the threshold distance 260 may be visualized as a thickness of the first line 250. The threshold distance 260 is predetermined by a user. Alternatively, or additionally, the system calculates the threshold distance 260 on the fly. The threshold distance 260 may depend on the scanner used by the system. The threshold distance 260 is a parameter that is trained by the classifier.

Figure 2C:
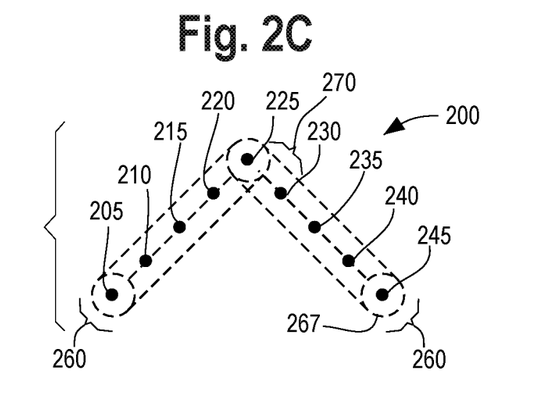

As shown in FIG. 2C, if the system determines that the second point 210 has a first distance 255 from the first line 250 of greater than or equal to the threshold distance 260, the system removes the first line 250 from the candidate set. The system then finds a farthest point that comprises a point that is farthest from the line 250. As depicted here, the system finds that the fifth point 225 is the farthest point 225.

The system then creates a second line 265 running from the first endpoint 205 to the farthest point 225. The system creates a third line 267 running from the farthest point 225 to the second endpoint 245. The system adds the second line 265 to the candidate set along with the indices of the points forming the second line 265, that is, the system adds the indices of the first endpoint 205 and of the farthest point 225. The system also adds the third line 267 to the candidate set along with the indices of the points forming the third line 267, that is, the system adds the indices of the farthest point 225 and of the second endpoint 245.

The system determines whether a second distance of the second point 210 from the second line 265 is less than the threshold distance 260. The system determines that the second point 210 has a second distance from the second line 265 of less than the threshold distance 260.

The system then proceeds to the third point 215 and determines whether a third distance of the third point 215 from the second line 265 is less than the threshold distance 260. The system determines that the third point 215 has a third distance from the second line 265 of less than the threshold distance 260.

The system then proceeds to the fourth point 220 and determines whether a fourth distance of the fourth point 220 from the second line 265 is less than the threshold distance 260. The system determines that the fourth point 220 has a fourth distance from the second line 265 of less than the threshold distance 260.

The system then proceeds to the fifth point 225 and determines whether a fifth distance of the fifth point 225 from the second line 265 is less than the threshold distance 260. The system determines that the fifth point 225 trivially has a fifth distance from the second line 265 of zero and therefore of less than the threshold distance 260.

The system then proceeds to the sixth point 230 and determines whether a sixth distance of the sixth point 230 from the third line 267 is less than the threshold distance 260. The system determines that the sixth point 230 has a sixth distance from the second line 265 of less than the threshold distance 260.

The system then proceeds to the seventh point 235 and determines whether a seventh distance of the seventh point 235 from the third line 267 is less than the threshold distance 260. The system determines that the seventh point 235 has a seventh distance from the second line 265 of less than the threshold distance 260.

The system then proceeds to the eighth point 240 and determines whether an eighth distance of the eighth point 240 from the third line 267 is less than the threshold distance 260. The system determines that the eighth point 240 has an eighth distance from the second line 265 of less than the threshold distance 260.

The system then proceeds to the second endpoint 245. The system determines that the second endpoint 245 trivially has a ninth distance from the third line 267 of zero and therefore of less than the threshold distance 260. In fact, as depicted, the second endpoint 245 trivially has a ninth distance from the third line 267 of zero and therefore of less than the threshold distance 260. The system then terminates the process.

Figure 2D:
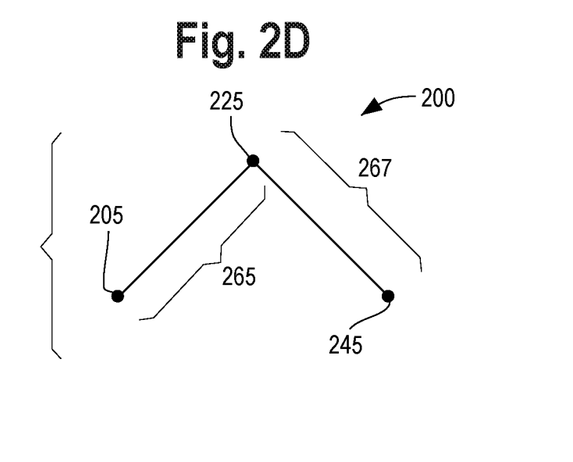

In FIG. 2D, the dotted lines indicating the width of the threshold distance (object 260 in FIGS. 2B-2C) are removed. Also the intermediate points (in FIGS. 2A-2C, points 210, 215, 220, 230, 235, and 240) are removed. What remains are the second line 265, the third line 267, the first and second endpoints 205 and 245, and the farthest point 225.

The system uses the number of candidate lines needed to cover all points in the segment as a factor used to compute a probability that an object comprises a target. The system can use training as part of the classifier in determining a number of acceptable lines in the covering set. A human appendage such as a human leg has a high number of lines, for example approximately six lines or more whereas corners, such as those found on shelves and posts will have few lines, for example, approximately two lines.

Optionally, the method includes an additional step, performed after the removing step, of identifying the segment as one or more of target and non-target. The identifying step may include using a number of candidate lines needed to cover all points in the segment as a factor in the identifying. The identifying step may include identifying the segment as one or more of comprising a target and not comprising a target.

The identifying step may include one or more of associating a higher number of needed candidate lines with a segment comprising a target and associating a lower number of needed candidate lines with a segment not comprising a target. The identifying step may include using one or more of Adaboost, a decision tree, a neural network, and another classifier. The identifying step may include a sub-step of training the system to improve the classification performance.

Optionally, the method may include a step, performed after the identifying step, of filtering the segment to integrate the classification with knowledge about one or more of locations of targets and locations of non-targets. The filtering step may include a sub-step of performing data association between a classified human appendage and a known location of a human. The filtering step may include using one or more of a particle filter, an Extended Kalman Filter (EKF), and another filter.

FIGS. 3A-3E are a set of drawings showing how the method for computing a probability that an object comprises a target is applied to a corner that the system identifies as target. The corner-identifying feature finds a minimum set of lines that can be used to cover all points in a segment 300.

Figure 3A:
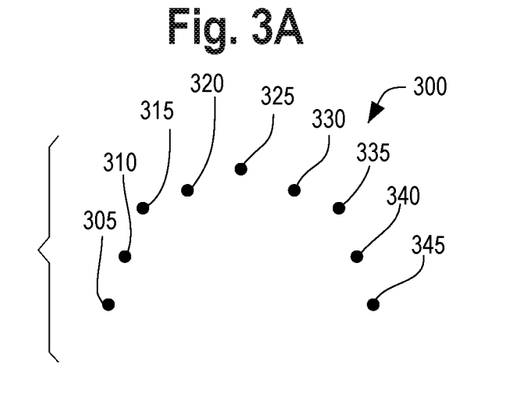
FIGS. 3A-3E are a set of drawings showing how the method for computing a probability that an object comprises a target is applied to a corner that the system identifies as target.

In FIG. 3A, a laser scanner scans the environment, generating a segment 300. As depicted in FIG. 3A, the laser scanner scans from left to right. The segment 300 comprises nine points, a first point 305, a second point 310, a third point 315, a fourth point 320, a fifth point 325, a sixth point 330, a seventh point 335, an eighth point 340, and a ninth point 345. The endpoints of the segment 300 are the first point 305 in the laser scan, which may also be referred to as a first endpoint 305, and the ninth point 345, which is the last point in the laser scan and which may also be referred to as a second endpoint 345.

Figure 3B:
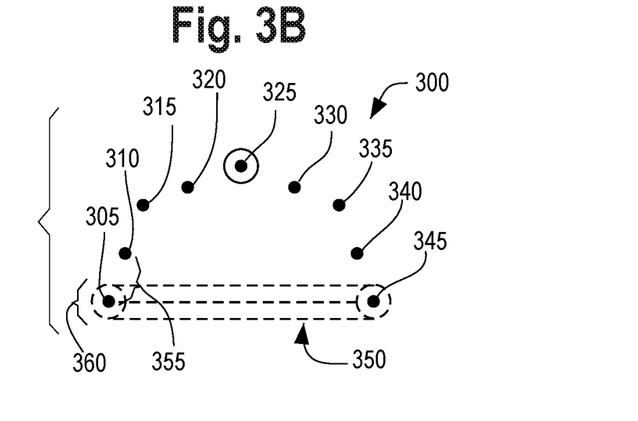

In FIG. 3B, the system draws a first line 350 that connects the first endpoint 305 to the second endpoint 345. The first line 350 becomes the first member of a candidate set of lines generated by the system in computing a probability that a corner comprises a target.

For at least one of the other points besides the first endpoint 305 and the second endpoint 345, the system compares the first line 350 to the point. For example, the system compares the second point 310 to the first line 350.

If the system determines that the second point 310 has a first distance 355 from the first line 350 of less than a threshold distance 360, then a line to the second point 310 is not added to the candidate set, but the system records the second point 310 as a point 310 that is covered by the existing candidate set. As depicted, the threshold distance 360 may be visualized as a thickness of the first line 350. The threshold distance 360 is predetermined by a user. Alternatively, or additionally, the system calculates the threshold distance 360 on the fly. The threshold distance 360 may depend on the scanner used by the system. The threshold distance 360 is a parameter that is trained by the classifier.

Figure 3C:
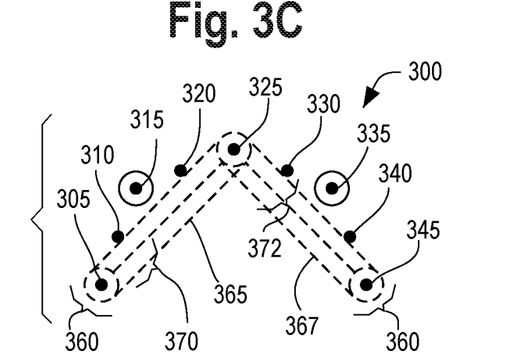

As shown in FIG. 3C, if the system determines that the second point 310 has a first distance 355 from the first line 350 of greater than or equal to the threshold distance 360, the system removes the first line 350 from the candidate set. The system then finds a farthest point that comprises a point that is farthest from the line 350. As depicted here, the system finds that the fifth point 325 is the first farthest point 325.

The system then creates a second line 365 running from the first endpoint 305 to the first farthest point 325. The system creates a third line 367 running from the first farthest point 325 to the second endpoint 345. The system adds the second line 365 to the candidate set along with the indices of the points forming the second line 365, that is, the system adds the indices of the first endpoint 305 and of the first farthest point 325. The system also adds the third line 367 to the candidate set along with the indices of the points forming the third line 367, that is, the system adds the indices of the first farthest point 325 and of the second endpoint 345.

The system then proceeds to the third point 315 and determines whether a third distance of the third point 315 from the second line 365 is less than the threshold distance 360.

The system determines that the second point 310 has a third distance 370 from the second line 365 of greater than or equal to the threshold distance 360.

The system determines that the sixth point 330 has a sixth distance 372 from the third line 367 of greater than or equal to the threshold distance 360.

Figure 3D:
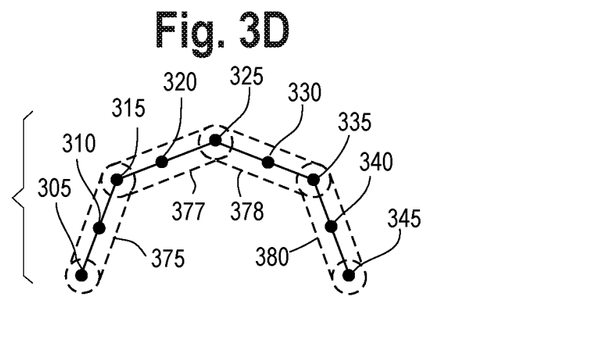

As shown in FIG. 3D, after the system determines that the second point 310 has a third distance 370 from the second line 365 of greater than or equal to the threshold distance 360, the system removes the second line 365 from the candidate set.

After the system determines that the sixth point 330 has a sixth distance 372 from the third line 367 of greater than or equal to the threshold distance 360, the system removes the second line 365 from the candidate set.

The system then finds a second farthest point that is farthest from the second line 365. As depicted here, the system finds that the third point 315 is the second farthest point 315.

The system then creates a fourth line 375 running from the first endpoint 305 to the second farthest point 315. The system creates a fifth line 377 running from the second farthest point 315 to the first farthest point 325. The system adds the fourth line 375 to the candidate set along with the indices of the points forming the fourth line 375, that is, the system adds the indices of the first endpoint 305 and of the second farthest point 315. The system also adds the fifth line 377 to the candidate set along with the indices of the points forming the fifth line 377, that is, the system adds the indices of the second farthest point 315 and of the first farthest point 325.

The system then finds a third farthest point that is farthest from the third line 367. As depicted here, the system finds that the seventh point 335 is the third farthest point 335.

The system then creates a fourth line 375 running from the first endpoint 305 to the second farthest point 315. The system creates a fifth line 377 running from the second farthest point 315 to the first farthest point 325. The system adds the fourth line 375 to the candidate set along with the indices of the points forming the fourth line 375, that is, the system adds the indices of the first endpoint 305 and of the second farthest point 315. The system also adds the fifth line 377 to the candidate set along with the indices of the points forming the fifth line 377, that is, the system adds the indices of the second farthest point 315 and of the first farthest point 325.

The system then creates a sixth line 378 running from the first farthest point 325 to the third farthest point 335. The system creates a seventh line 380 running from the third farthest point 335 to the second endpoint 345.

The system determines whether a distance of the second point 310 from the fourth line 375 is less than the threshold distance 360. The system determines that the second point 310 has a distance from the fourth line 375 of less than the threshold distance 360.

The system then proceeds to the third point 315 and determines whether a third distance of the third point 315 from the fourth line 375 is less than the threshold distance 360. The system determines that the third point 315 trivially has a third distance from the fourth line 375 of zero and therefore of less than the threshold distance 360.

The system then proceeds to the fourth point 320 and determines whether a fourth distance of the fourth point 320 from the fifth line 377 is less than the threshold distance 360. The system determines that the fourth point 320 has a fourth distance from the fifth line 377 of less than the threshold distance 360.

The system then proceeds to the fifth point 325 and determines whether a third distance of the fifth point 325 from the fifth line 377 is less than the threshold distance 360. The system determines that the fifth point 325 trivially has a distance from the fifth line 377 of zero and therefore of less than the threshold distance 360.

The system then proceeds to the sixth point 330 and determines whether a sixth distance of the sixth point 330 from the sixth line 378 is less than the threshold distance 360. The system determines that the sixth point 330 has a sixth distance from the sixth line 378 of less than the threshold distance 360.

The system then proceeds to the seventh point 335 and determines whether a seventh distance of the seventh point 335 from the sixth line 378 is less than the threshold distance 360. The system determines that the seventh point 335 trivially has a distance from the sixth line 378 of zero and therefore of less than the threshold distance 360.

The system then proceeds to the eighth point 340 and determines whether an eighth distance of the eighth point 340 from the seventh line 380 is less than the threshold distance 360. The system determines that the eighth point 340 has an eighth distance from the seventh line 380 of less than the threshold distance 360.

The system then proceeds to the second endpoint 345 and determines whether a ninth distance of the second endpoint 345 from the seventh line 380 is less than the threshold distance 360. The system determines that the second endpoint 345 trivially has a distance from the seventh line 380 of zero and therefore of less than the threshold distance 360. The system then terminates the process.

Figure 3E:
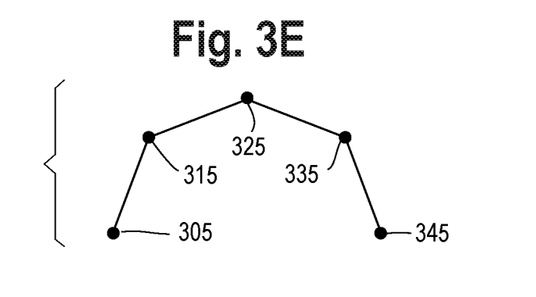

In FIG. 3E, the dotted lines indicating the width of the threshold distance (object 360 in FIGS. 3B-3D) are removed. Also the intermediate points (in FIGS. 3A-3C, points 310, 315, 320, 330, 335, and 340) are removed. What remains are the second line 365, the third line 375, the first and second endpoints 305 and 345, and the first farthest point 325.

The metrics used, and the thresholds used, may be automatically trained from sample data using algorithms such as Adaboost, decision trees, neural networks, or another classifier. For example, training can be done in two stages to improve classification performance: 1) collecting scans that have no objects of interest by driving the robot (either autonomously or under human control) through an environment that is empty of objects of interest. For example, scans that have no human legs are collected by driving the robot through an environment that is empty of human legs. Negative data is thereby generating training the system regarding objects that are not human legs. 2) The second batch of data is collected by having a human wear a vest comprising a tag configured to track a location of the human. The scan data is then correlated against information on the location of the human obtained from the tag. For example, the tag comprises one or more of an augmented reality (AR) tag, a radio frequency identification (RFID) tag, and another tag.

After each scan has been segmented and classified, a filter may be run on individual leg candidates to track their movement from scan to scan. This provides a means to estimate a value from a model of expected movement and expected sensor readings. For example, the filter comprises one or more of a particle filter, an Extended Kalman Filter (EKF), and another filter. The filter provides a means to integrate knowledge about one or more of locations of targets and locations of non-targets with the new information generated by the classification.

After the leg candidates have been tracked, a filter may do data association between legs and the human. Each filter will approximate one potential human, who can be paired with at most two candidate legs.

To improve classification, it is possible to remove a segment that corresponds to a non-moving object. Alternatively, or additionally, a segment that corresponds to a non-moving object is removed as part of filtering. One method to do this is, when filtering, to consult a map that indicates where these non-moving objects of interest are located, so as to perform one or more of reducing a weight accorded to such non-moving objects and completely removing the non-moving object. For example, the map can be generated using one or more of simultaneous localization and mapping (SLAM) and another mapping method. Alternatively, a costmap can be used to reduce a weight of non-moving objects of interest, allowing the factoring into the classifier's calculation of likely cost as a function of distance. Such a step reduces the odds of known things like shelves, tables, walls, and the like from being detected as legs.

Optionally, the method includes an additional step, performed after the removing step, of computing a probability that the segment comprises the target. The identifying step may includes using a number of candidate lines needed to cover all points in the segment as a factor in the identifying. The identifying step may include identifying the segment as one or more of comprising the target and not comprising the target.

The identifying step may include one or more of associating a higher number of needed candidate lines with a segment comprising a target and associating a lower number of needed candidate lines with a segment not comprising a target. The identifying step may include using one or more of Adaboost, a decision tree, a neural network, and another classifier. The identifying step may include a sub-step of training the system to improve the classification performance.

Optionally, the method may include a step, performed after the identifying step, of filtering the segment to integrate the classification with knowledge about one or more of locations of targets and locations of non-targets. The filtering step may include a sub-step of performing data association between a classified human appendage and a known location of a human. The filtering step may include using one or more of a particle filter, an Extended Kalman Filter (EKF), and another filter.

Figure 4:
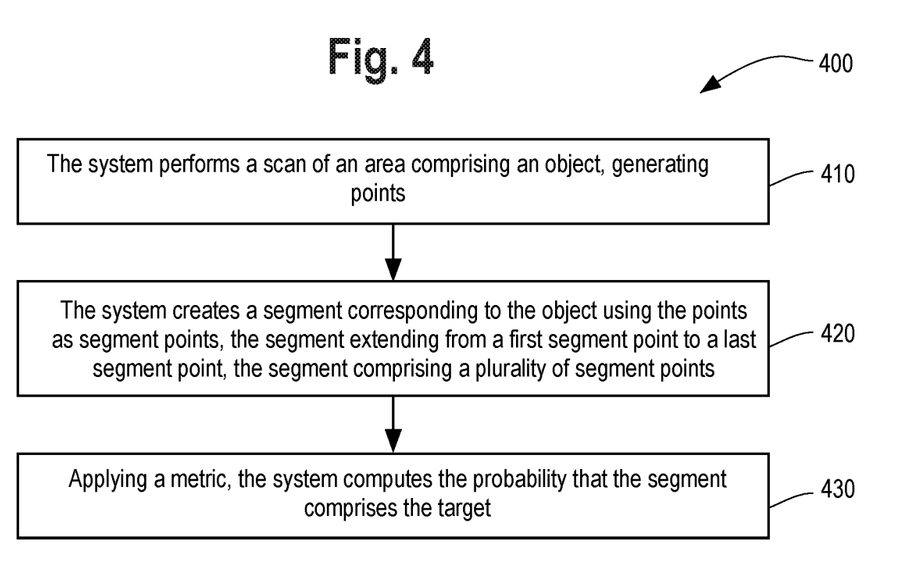
FIG. 4 is a flowchart of a method for computing a probability that an object comprises a target.

FIG. 4 is a flowchart of a method 400 for computing a probability that an object comprises a target. The order of the steps in the method 400 is not constrained to that shown in FIG. 4 or described in the following discussion. Several of the steps could occur in a different order without affecting the final result.

In step 410, the system performs a scan of an area comprising an object, generating points. Block 410 then transfers control to block 420.

In step 420, the system creates a segment corresponding to the object using the points as segment points, the segment extending from a first segment point to a last segment point, the segment comprising a plurality of the segment points. Block 420 then transfers control to block 430.

In step 430, applying a metric, the system computes the probability that the segment comprises the target. Block 430 then terminates the process. Alternatively, or additionally, block 430 loops back to block 410 and the process begins again.

Figure 5:
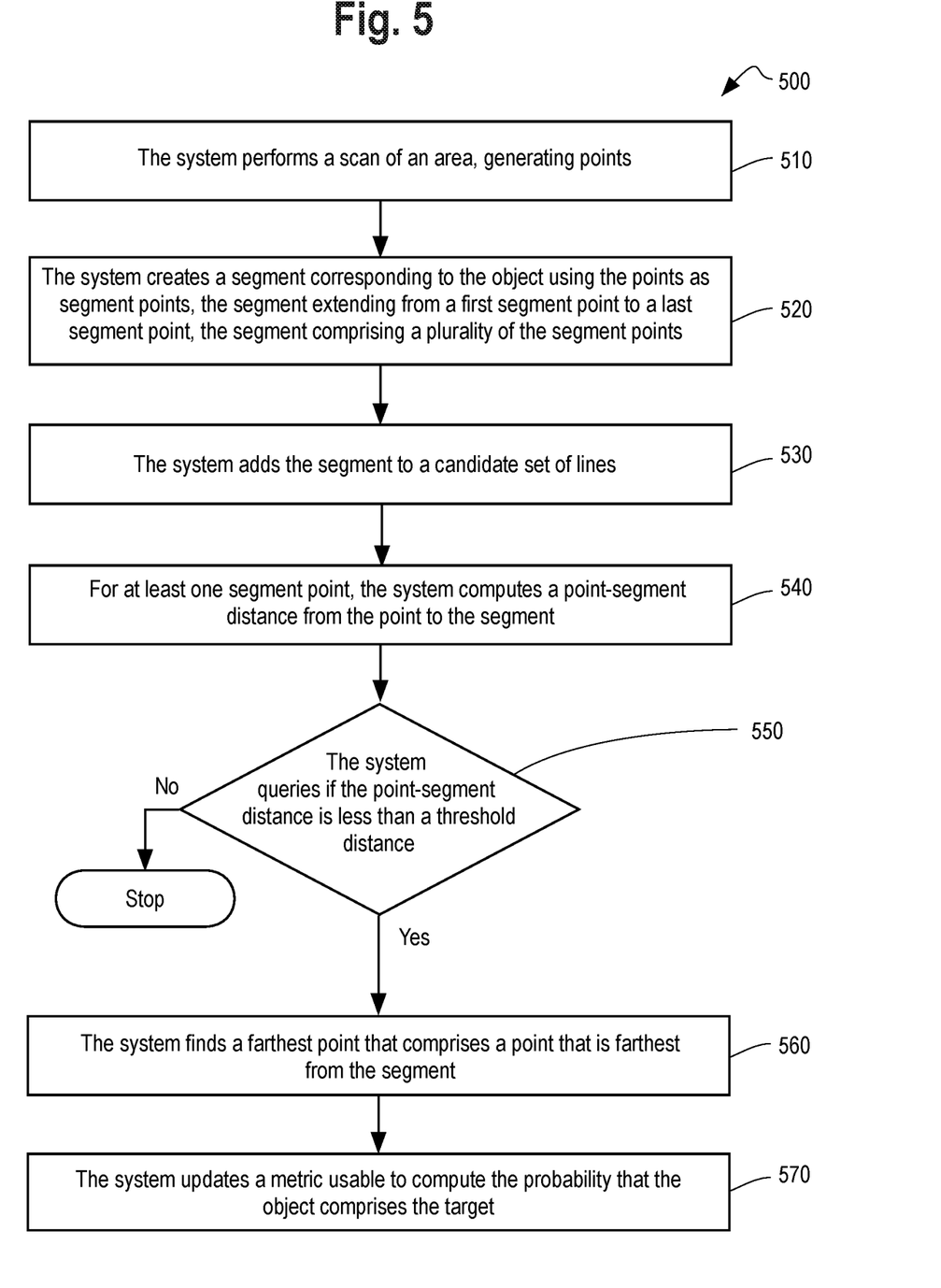
FIG. 5 is a flowchart of a method for computing a probability that an object comprises a target.

FIG. 5 is a flowchart of a method 500 for computing a probability that an object comprises a target. The order of the steps in the method 500 is not constrained to that shown in FIG. 5 or described in the following discussion. Several of the steps could occur in a different order without affecting the final result.

In step 510, the system performs a scan of an area, generating points. Block 510 then transfers control to block 520.

In step 520, the system creates a segment corresponding to the object using the points as segment points, the segment extending from a first segment point to a last segment point, the segment comprising a plurality of the segment points. Block 520 then transfers control to block 530.

In step 530, the system adds the segment to a candidate set of lines. Block 530 then transfers control to block 540.

In step 540, for at least one segment point, the system computes a point-segment distance from the point to the segment. Block 540 then transfers control to block 550.

In step 550, the system queries if the point-segment distance is less than a threshold distance. If yes, the system proceeds to step 560. If no, the system terminates the process.

In step 560, the system finds a farthest point that comprises a point that is farthest from the segment. Block 560 then transfers control to block 570.

In step 570, the system updates a metric usable to compute the probability that the object comprises the target. Block 570 then terminates the process.

Figure 6:
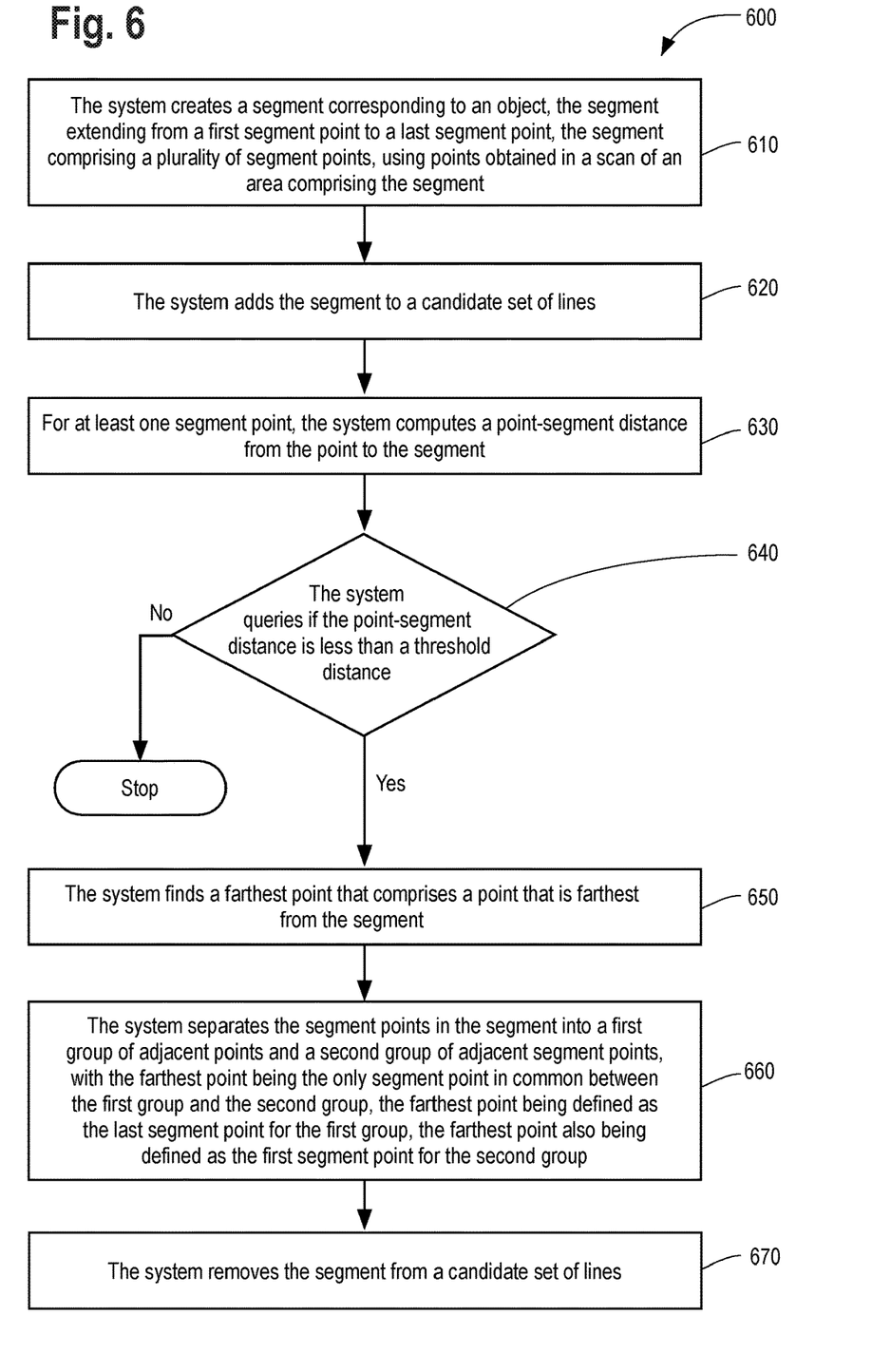
FIG. 6 is a flowchart of a method for computing a probability that an object comprises a target.

FIG. 6 is a flowchart of a method 600 for computing a probability that an object comprises a target. The order of the steps in the method 600 is not constrained to that shown in FIG. 6 or described in the following discussion. Several of the steps could occur in a different order without affecting the final result.

In step 610, the system creates a segment corresponding to an object, the segment extending from a first segment point to a last segment point, the segment comprising a plurality of segment points, using points obtained in a scan of an area comprising the segment. Block 610 then transfers control to block 620.

In step 620, the system adds the segment to a candidate set of lines. Block 620 then transfers control to block 630.

In step 630, for at least one segment point, the system computes a point-segment distance from the point to the segment. Block 630 then transfers control to block 640.

In step 640, the system queries if the point-segment distance is less than a threshold distance. If yes, the system proceeds to step 650. If no, the system terminates the process.

In step 650, the system finds a farthest point that comprises a point that is farthest from the segment. Block 650 then transfers control to block 655.

In step 660, the system separates the segment points in the segment into a first group of adjacent segment points and a second group of adjacent segment points, with the farthest point being the only segment point in common between the first group and the second group, the farthest point being defined as the last segment point for the first group, the farthest point also being defined as the first segment point for the second group. Block 660 then transfers control to block 670.

In step 670, the system removes the segment from a candidate set of lines. Block 670 then terminates the process.

Figure 7:
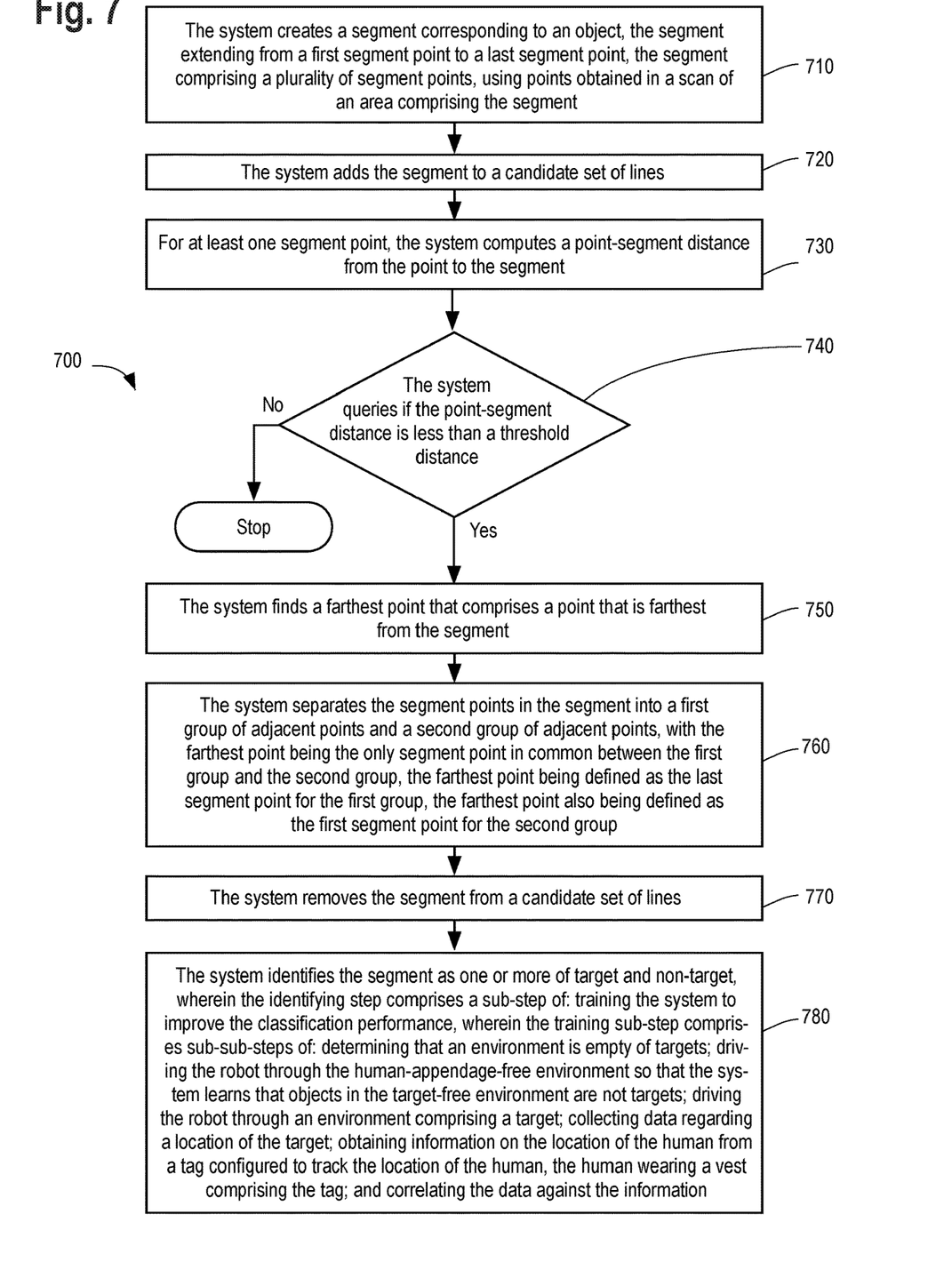
FIG. 7 is a flowchart of a method for computing a probability that an object comprises a target.

FIG. 7 is a flowchart of a method 700 for computing a probability that an object comprises a target. The order of the steps in the method 700 is not constrained to that shown in FIG. 7 or described in the following discussion. Several of the steps could occur in a different order without affecting the final result.

In step 710, the system creates a segment corresponding to an object, the segment extending from a first segment point to a last segment point, the segment comprising a plurality of segment points, using points obtained in a scan of an area comprising the segment. Block 710 then transfers control to block 720.

In step 720, the system adds the segment to a candidate set of lines. Block 720 then transfers control to block 730.

In step 730, for at least one segment point, the system computes a point-segment distance from the point to the segment. Block 730 then transfers control to block 740.

In step 740, the system queries if the point-segment distance is less than a threshold distance. If yes, the system proceeds to step 750. If no, the system terminates the process.

In step 750, the system finds a farthest point that comprises a point that is farthest from the segment. Block 750 then transfers control to block 760.

In step 760, the system separates the segment points in the segment into a first group of adjacent segment points and a second group of adjacent segment points, with the farthest point being the only segment point in common between the first group and the second group, the farthest point being defined as the last segment point for the first group, the farthest point also being defined as the first segment point for the second group. Block 760 then transfers control to block 770.

In step 770, the system removes the segment from a candidate set of lines. Block 770 then transfers control to block 780.

In step 780, the system identifies the segment as one or more of target and non-target, wherein the identifying step comprises a sub-step of: training the system to improve the classification performance, wherein the training sub-step comprises sub-sub-steps of: determining that an environment is empty of targets; driving the robot through the target-free environment so that the system learns that objects in the target-free environment are not targets; driving the robot through an environment comprising a target; collecting data regarding a location of the target; obtaining information on the location of the human from a tag configured to track the location of the human, the human wearing a vest comprising the tag; and correlating the data against the information. Block 780 then terminates the process.

Once an object has been classified as a human, the system can set the human as a goal, and the system can plan a path for the robot to the goal using a motion planner. The planning goal represents the set of states we want to reach in order to find a valid path. For example, the system can use one or more of a search-based planner, a sampling-based planner, an optimization based planner, and another planner. The robot's position can be represented by its location and spatial orientation (x, y, θ). The system can plan to move the robot from the initial system state to a goal state that corresponds to a position behind the human. For a search-based planner, the system applies motion primitives to successive states, expanding only the best states. A motion primitive is defined as a small motion that can be composed to move the robot. For example, a motion primitive comprises an instruction to do one or more of drive straight, turn 180 degrees, turn 10 degrees counterclockwise, drive a given distance, and the like.

At a given point in the planning, the system determines the best state using a heuristic. For example, the heuristic comprises one or more of a Euclidean distance, an A* search algorithm, a Manhattan distance, and another heuristic. For example, to ensure that the robot sees the human, we can constrain the planner by imposing a visibility constraint. For example, the system may implement the visibility constraint by requiring that a straight line from the robot sensor origin reach the human without passing through an obstacle. This visibility constraint will force the planner to plan paths where robot can always see the human, and can also factor in other moving targets and known static targets that may occlude its view during the motion.

Advantages of embodiments of the invention include facilitating a rapid and accurate determination as to whether an appendage is human or non-human, enabling an effective "follow pick" order fulfillment system in which a robot follows a human. Embodiments of the invention eliminate or reduce the likelihood of a robot mistakenly concluding that a non-human object is human.

For example, it will be understood by those skilled in the art that software used by the system and method for order fulfillment and inventory management using robots may be located in any location in which it may be accessed by the system. It will be further understood by those of skill in the art that the number of variations of the network, location of the software, and the like are virtually limitless. For example, the threshold distance may vary for the different lines. It is intended, therefore, that the subject matter in the above description shall be interpreted as illustrative and shall not be interpreted in a limiting sense.

While the above representative embodiments have been described with certain components in exemplary configurations, it will be understood by one of ordinary skill in the art that other representative embodiments can be implemented using different configurations and/or different components. For example, it will be understood by one of ordinary skill in the art that the order of certain steps and certain components can be altered without substantially impairing the functioning of the invention.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. It is intended, therefore, that the subject matter in the above description shall be interpreted as illustrative and shall not be interpreted in a limiting sense.

What is claimed is:

1. A method for computing a probability that an object comprises a target, comprising:
   using a computer, using segment points obtained in a scan of an area comprising a segment, the segment comprising a plurality of segment points, creating a line corresponding to the object, the line extending from a first segment point to a last segment point;
   using the computer, adding the line to a candidate set of lines;
   using the computer, for at least one segment point, computing a point-line distance from the point to the line; and
   using the computer, determining that the point-line distance is less than a threshold distance;
   using the computer, finding a farthest point that comprises the point that is farthest from the line;
   using the computer, separating the segment points in the segment into a first group of adjacent segment points and a second group of adjacent segment points, with the farthest point being the only segment point in common between the first group and the second group, the farthest point being defined as the last segment point for the first group, the farthest point also being defined as the first segment point for the second group; and
   using the computer, removing the line from a candidate set of lines;
   using the computer, identifying the segment as one or more of target and non-target; and filtering the segment to integrate the classification with knowledge about one or more of locations of humans and locations of non-humans.

2. The method of claim 1, wherein the filtering step comprises a sub-step of performing data association between a classified human appendage and a known location of a human.

3. The method of claim 1, wherein the filtering step comprises using one or more of a particle filter, an Extended Kalman Filter (EKF), and another filter.

4. A method for computing a probability that an object comprises a target, comprising:
   using a computer, using segment points obtained in a scan of an area comprising a segment, the segment comprising a plurality of segment points, creating a line corresponding to the object, the line extending from a first segment point to a last segment point;
   using the computer, adding the line to a candidate set of lines;
   using the computer, for at least one segment point, computing a point-line distance from the point to the line; and
   using the computer, determining that the point-line distance is less than a threshold distance;
   using the computer, finding a farthest point that comprises the point that is farthest from the line;
   using the computer, separating the segment points in the segment into a first group of adjacent segment points and a second group of adjacent segment points, with the farthest point being the only segment point in common between the first group and the second group, the farthest point being defined as the last segment point for the first group, the farthest point also being defined as the first segment point for the second group; and
   using the computer, removing the line from a candidate set of lines;
   using the computer, identifying the segment as one or more of target and non-target, wherein the identifying step comprises a sub-step of removing a segment that corresponds to a non-moving object.

5. The method of claim 4, wherein the removing sub-step comprises a sub-sub-step of:
   performing one or more of reducing a weight accorded to the non-moving object and completely removing the non-moving object.

6. The method of claim 5, wherein the performing sub-sub-step comprises:
   consulting a map that indicates where the non-moving objects is located.

7. The method of claim 5, wherein the performing sub-sub-step comprises:
   consulting a costmap, factoring into the performing a calculation of likely cost as a function of distance.

8. The method of claim 1, wherein the filtering step comprises a sub-step of remove a segment that corresponds to a non-moving object.

9. The method of claim 8, wherein the removing sub-step comprises a sub-sub-step of:
   performing one or more of reducing a weight accorded to the non-moving object and completely removing the non-moving object.

10. The method of claim 9, wherein the performing sub-sub-step comprises:
    consulting a map that indicates where the non-moving objects is located.

11. The method of claim 9, wherein the performing sub-sub-step comprises:
    consulting a costmap, factoring into the performing a calculation of likely cost as a function of distance.

* * * * *